Figure 1:
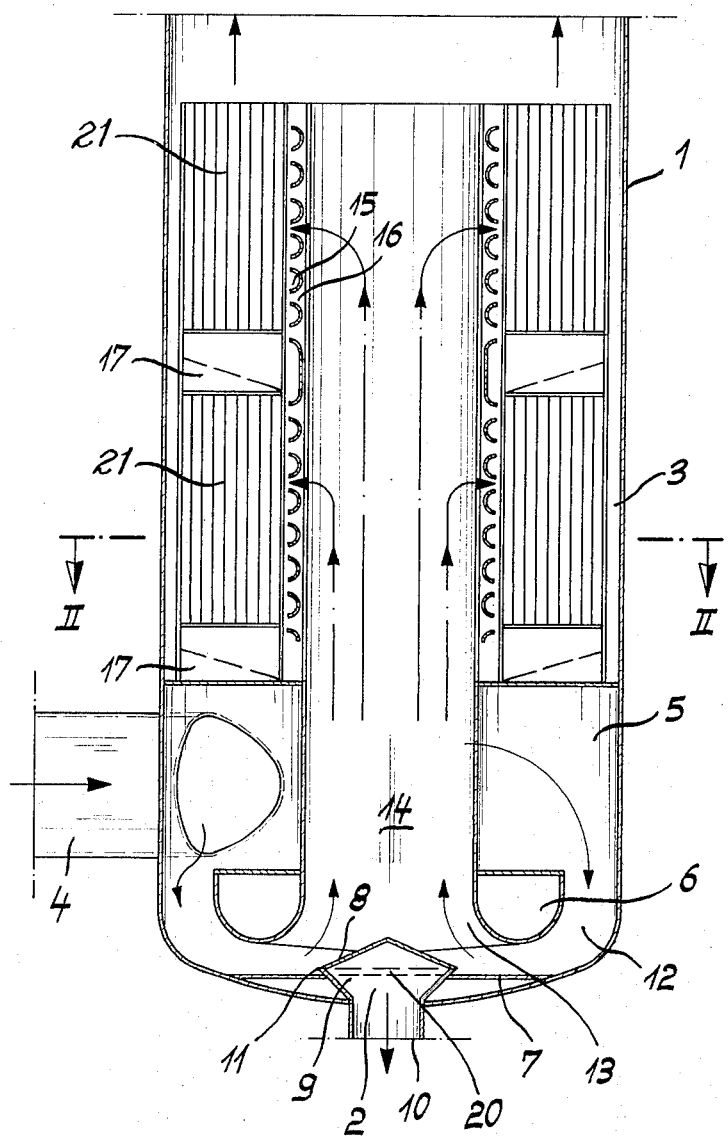

# United States Patent [19]
Kall et al.

[11] 3,870,493
[45] Mar. 11, 1975

[54] APPARATUS FOR SEPARATING LIQUID FROM A LIQUID CONTAINING GAS FLOW

[75] Inventors: Horst Kall; Klaus Riedel, both of Gummersbach, Germany

[73] Assignee: L. & C. Steinmuller G.m.b.H., Germany

[22] Filed: June 9, 1972

[21] Appl. No.: 261,372

[30] Foreign Application Priority Data
June 11, 1971 Germany............................ 2128897

[52] U.S. Cl. ................ 55/391, 55/459, 55/463, 55/DIG. 23
[51] Int. Cl. ............................................. B01d 45/12
[58] Field of Search ............ 55/413, 414, 440, 459, 55/337, 422, 391, 318, 325, 326, 394, 399, 445, 462, 463, 483, 484, 521, 498, DIG. 23

[56] References Cited
UNITED STATES PATENTS

| | | | |
|---|---|---|---|
| 2,087,219 | 7/1937 | Dorfan.................................. | 55/337 |
| 3,296,779 | 1/1967 | Daman et al. ........................ | 55/337 |
| 3,499,270 | 3/1970 | Paugh................................... | 55/337 |

FOREIGN PATENTS OR APPLICATIONS

| | | | |
|---|---|---|---|
| 828,317 | 1/1952 | Germany .............................. | 55/337 |
| 450,180 | 7/1948 | Canada................................. | 55/394 |

*Primary Examiner*—Frank W. Lutter
*Assistant Examiner*—David L. Lacey
*Attorney, Agent, or Firm*—Walter Becker

[57] ABSTRACT

An apparatus for separating liquid from a liquid containing gas flow, in which between a coarse separator and a fine separator arranged in a container there is provided an annular chamber with at least one connection for the gas flow, said annular chamber being closed at the top and open at the bottom and communicating with a central passage closed at the top. Within the region where the annular chamber communicates with the central passage there is provided a deviating body defining with the adjacent container wall and the coarse separator nozzle-shaped passages, while the central passage above the annular chamber is, at least partly, defined by flow guiding and distributing elements between which nozzle-shaped passages lead to the fine separator.

5 Claims, 2 Drawing Figures

APPARATUS FOR SEPARATING LIQUID FROM A LIQUID CONTAINING GAS FLOW

The present invention relates to an apparatus for separating liquid from a flow containing a large quantity of gas and, more specifically, concerns an apparatus of the above mentioned type which is equipped with coarse and fine separators arranged in a container.

The now-a-days customary fine separators for drying steam (so-called zig-zag separators) must receive the liquid only at a relatively low medium velocity with regard to the dryer surface corresponding to a pressure head of a few millimeters water column.

In particular, when designing steam dryers which are to be built into the steam circuits and boiling and pressure water reactors between the high pressure and the low pressure part, there exists the difficulty to provide a large drying surface in a minimum of space and so to design the flow path that a uniform distribution of steam and water will be effected at low pressure losses. With this type of apparatus, the ratio of the pressure head $q_Z$ in the feeding lines to the pressure head $q_T$ in front of the dryer amounts to approximately $q_Z/q_T = 450$.

It is an object of the present invention to provide an apparatus by means of which in a proper manner liquid can be separated from a flow containing a large quantity of gas, without the necessity of having to put up with high pressure losses.

This object and other objects and advantages of the invention will appear more clearly from the following specification, in connection with the accompanying drawings, in which:

FIG. 1 diagrammatically illustrates a longitudinal section through an apparatus according to the present invention.

Figure 2:
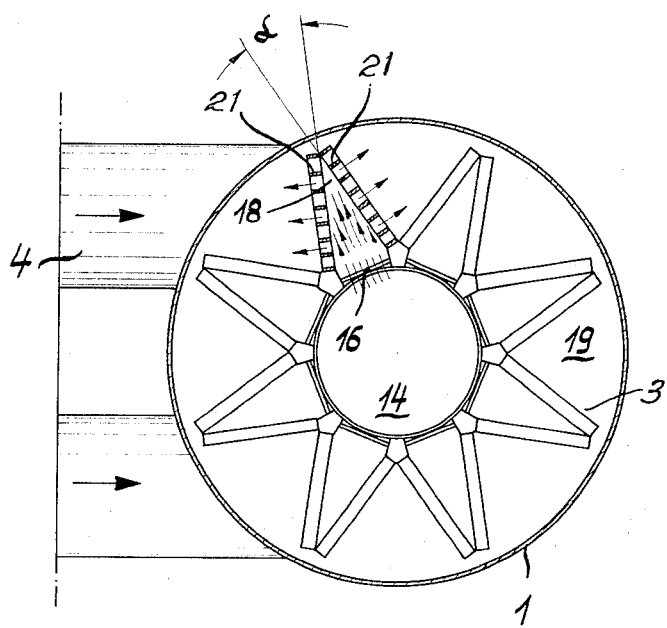

FIG. 2 represents a section taken along the line II — II of FIG. 1.

The apparatus according to the present invention is characterized primarily in that between the coarse separator and the fine separator there is provided an annular chamber with at least one connection for the gas flow, said annular chamber being closed at the top and open at the bottom leading into a central passage closed at the top while within the outlet range there is provided a deviating body closed on all sides, the confinement of which, together with the container wall and the confinement of the coarse separator forms nozzle-shaped passages. The apparatus according to the invention is furthermore characterized in that the central passage above the annular chamber is confined by flow guiding and distributing elements between which nozzle-shaped passages lead to the fine separators.

In order already at the first deviation of the gas flow to obtain a liquid separation — coarse separation —, it is provided according to the present invention that the coarse separator comprises an annular plate and a centrally mounted cone which is held by star-shaped plates in a funnel-shaped outlet arranged adjacent to and arranged below said cone while between the lower margin of the cone and the annular plate gaps are provided.

The first deviation of the gas flow is effected about a deviating body which according to a further development of the invention has its lower confinement arranged at an incline with regard to the horizontal plane. This preferred embodiment of the invention is, however, necessary only when a unilaterally oncoming flow of the gas flow into the annular chamber occurs.

Sometimes it is necessary to control the speed distribution of the gas flow in the central passage. Therefore, according to a further development of the invention, it is suggested that the deviating body is displaceable in axial direction.

For purposes of arranging the fine separating packets, it may be expedient to design the central passage somewhat special with regard to its cross section. According to a preferred embodiment of the invention it is, therefore, suggested that the central passage has a polygonal cross section and that those fine separator packets which are arranged laterally of the passages and placed on the outside wall extend in radial direction and together define an acute angle at the apex of which they are in tight engagement.

Furthermore, according to the invention, one or more fine separator systems may be provided above the annular chamber.

Referring now to the drawings in detail, the apparatus according to the present invention comprises a container 1 having inserted therein a coarse separator 2 and a fine separator means 3. Connected to the container 1 are two connections 4 through which the gas flow enters the container 1. The connections 4 lead into an annular chamber 5 which is closed at the top and open at the bottom. At the bottom side of the annular chamber 5 there is provided a deviating body 6 which is closed on all sides and is shaped and located in a manner to favor and facilitate flow relative thereto.

The object of the deviating body 6 is to form diffuser-like passages 12, 13 in order to force flow of a quantity of gas into the annular chamber 5 by way of the connections 4 for uniform engagement of the coarse separator 2. The deviating body 6 is located at the lower part of a central passage 14 and forms a structural unit therewith.

The coarse separator 2 is composed primarily of an annular plate 7 and a cone 8 centrally mounted on said annular plate 7. Cone 8 is, by means of plates 9, inserted in a star-shaped manner into the funnel-shaped discharge 10. The lower margin 11 of the cone 8 is arranged at a distance from the annular plate 7 so that gaps 20 are formed through which the liquid separated during the first deviation can flow into the funnel 10. The cone 8 of the coarse separator 2 is formed unitary with the plates 9 with gaps 20 provided for through passage of fluid particles to be separated. The plates 9 are connected centrally in the annular plate 7 that is fixed to the container 1.

The deviating body 6 with the walls of container 1 and the surface of cone 8, forms nozzle or diffuser-like passages 12, 13. The diffuser-like passage 13 leads into a central passage 14 closed at the upper end. The lateral walls of this central passage 14 above the annular chamber 5 are formed by current guiding and distributing elements 15 between which likewise nozzle-shaped passages 16 lead to the fine separating packets 21. Below the individual fine separator packets 21 there are provided water boxes 17.

The coarse separator 2 clearly has as an object the separation of large fluid particles as a consequence of the relatively sharp change of direction of the flow of gas quantity in such a way that due to gravity of the fluid particles the latter cannot follow the gas flow and thus the fluid particles become driven into the gaps 20 and thereby become driven out of the apparatus.

The construction of the individual fine separator packets is evident from FIG. 2. The central passage 14 is preferably above the annular chamber 5 and the central passage 14 is preferably of a polygonal shape. Laterally of the passages 16, fine separator packets 21 are provided which, as mentioned above, in radial direction confine with each other an acute angle α. Within the region of the apex of the angle, the separator packets 21 are located closely adjacent to each other. The space 18 which at the onflow side is enclosed by the fine separator packet means 3 is closed toward the top by means of a non-illustrated plate. The free space 19 which is likewise confined by two fine separator packets 21 is, however, opened toward the top.

The function of the device according to the invention is as follows: The gas flow passes through the connections 4 into the annular chamber 5. Here the flow is deviated about the deviating body 6 in downward direction and subsequently in upward direction into the central passage 14. The liquid droplets contained first in the gas flow directed downwardly are accelerated during their movement in downward direction and are centrifuged against the container wall 1. The gas flow now drives the individual liquid droplets into the funnel-shaped outlet 10 through the annular plate 7 and the gap 20. The gas flow freed from a portion of its liquid is deviated by the deviating body 6 into the central passage 14. The flow occurs first in particular within the region of the annular chamber 5, vertically upwardly, and subsequently during its further course in upward direction is deviated by the flow guiding and distributing elements forming the confinement of the passage 14, and finally is conveyed into the individual fine separator packets.

The gas flow leaves the nozzle-shaped slots 16 along a horizontal plane and after a sharp deviation flows into the fine separator packets 21. Due to the sharp deviation, differences in velocity which occur by the confluence of different jets leaving the slots will have no effect upon the flow-through of the fine separators. From the fine separators, the gas flows into the free chambers 19 and from here is deviated in upward direction. By special steps, as for instance, the installation of displacement bodies into the free chambers 19, or by the installation of perforated plates on the discharge side of the fine separators it will be assured that the fine separators will be uniformly passed through over their height.

It is, of course, to be understood that the present invention is, by no means, limited to the particular showing in the drawings, but also comprises any modifications within the scope of the appended claims.

What we claim is:

1. An apparatus for separating liquid from a liquid containing gas flow, which includes: container means, coarse separator means arranged in the lower portion of said container means, fine separator means arranged in the upper portion of said container means in vertically spaced relationship to said coarse separator means and provided with means for discharging the gas from which liquid has been separated in said fine separator means, annular chamber forming means interposed between said coarse separator means and said fine separator means and having at least one inlet forming means tangentially disposed for connection with a source of liquid containing gas to be processed, said annular chamber means being open at the bottom and closed at the top thereof, means forming a region of communication including conduit means axially arranged within said container means and closed at the top and communicating at the bottom with said annular chamber means, deviating means arranged within the region of communication of said conduit means with said annular chamber means and together with said container means and said coarse separator means forming nozzle means tapering in the direction toward said conduit means and establishing the communication between said annular chamber means and said conduit means, and gas flow guiding and distributing means forming part of at least a portion of that section of the wall of said conduit means which is located above said annular chamber, said guiding and distributing means forming with each other nozzle-shaped passages communicating with said fine separator means.

2. An apparatus according to claim 1, in which said coarse separator means comprises: an annular plate, a cone centrally mounted on said annular plate and together therewith enclosing gaps, an outlet arranged below said cone, and plate means arranged in a manner to form a star-shaped configuration and supporting said cone in said outlet.

3. An apparatus according to claim 1, in which said deviating means includes a body having a lower wall inclined relative to the horizontal.

4. An apparatus according to claim 1, in which said conduit means has a polygonal cross-sectional contour, and in which said fine separator means include fine separator packets extending laterally from said nozzle-shaped passages so that each pair of adjacent separator packets extend generally in a radial direction forming an acute angle with each other and contacting each other at the apex.

5. An apparatus according to claim 1, in which said fine separator means include at least one system of a plurality of pairs of separator packets above the annular chamber forming means.

* * * * *